Feb. 9, 1960 V. J. RIGOLINI 2,924,155
APPARATUS FOR SHAPING AND AFFIXING PLIABLE
MATERIAL TO A SUPPORT
Filed June 18, 1958 3 Sheets-Sheet 1
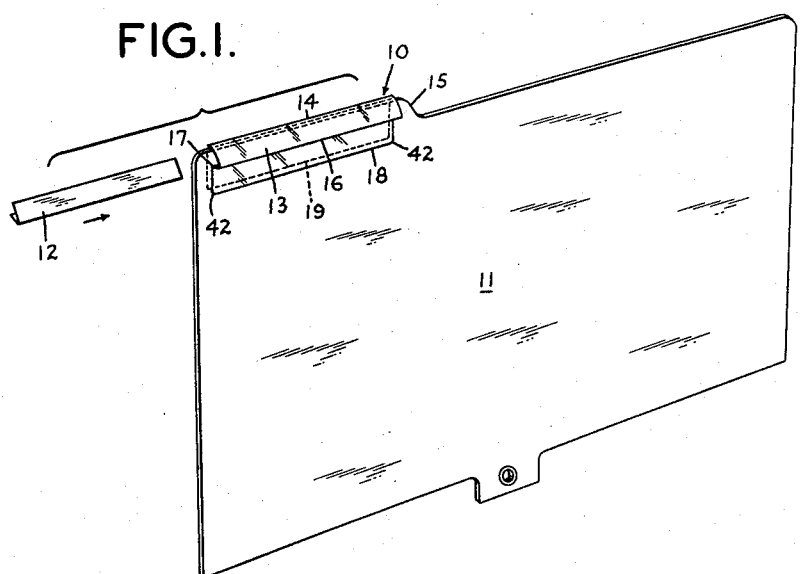
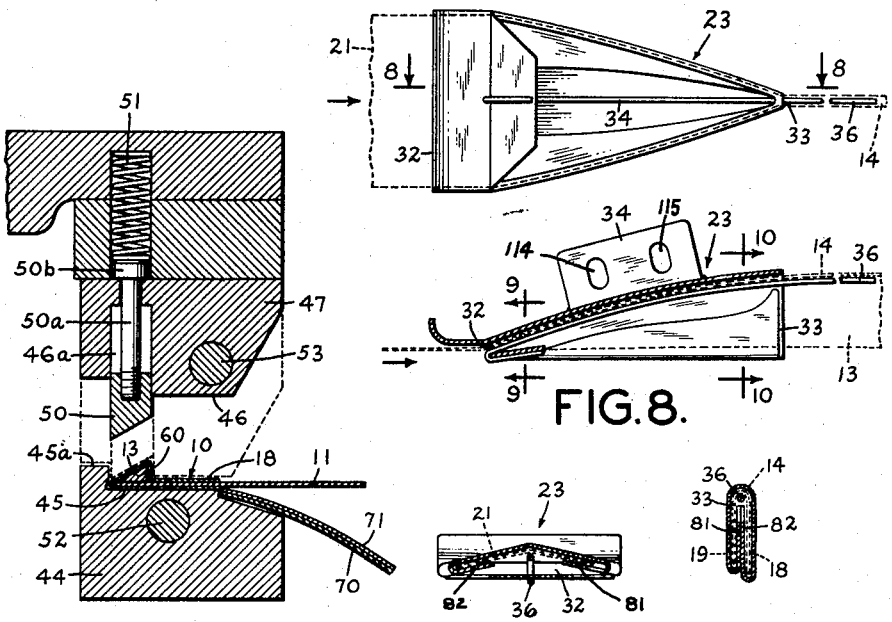

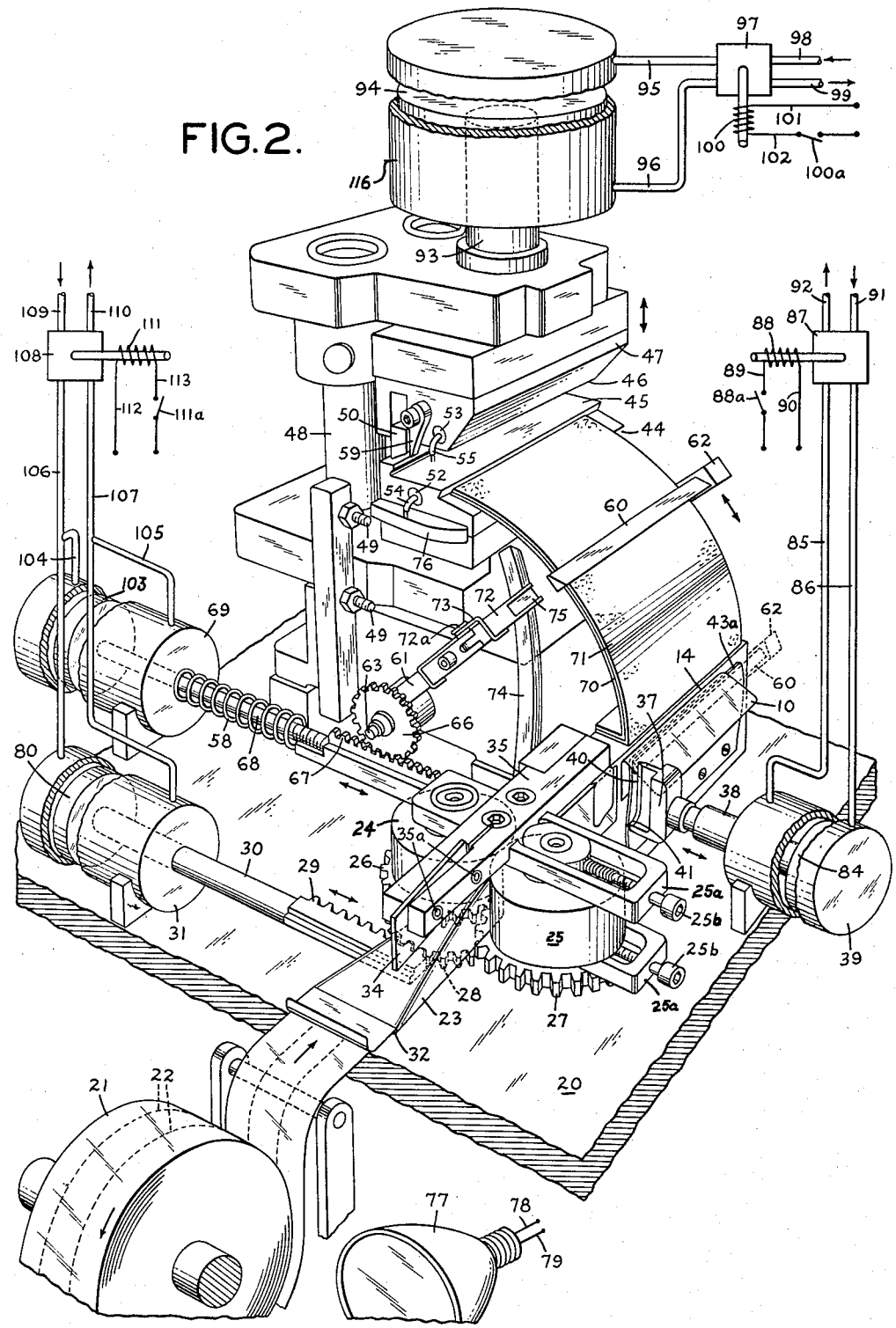

Feb. 9, 1960 V. J. RIGOLINI 2,924,155
APPARATUS FOR SHAPING AND AFFIXING PLIABLE
MATERIAL TO A SUPPORT
Filed June 18, 1958 3 Sheets-Sheet 3

United States Patent Office 2,924,155
Patented Feb. 9, 1960

2,924,155

APPARATUS FOR SHAPING AND AFFIXING PLIABLE MATERIAL TO A SUPPORT

Vinnie J. Rigolini, Brooklyn, N.Y., assignor to Whitehouse Products, Inc., Brooklyn, N.Y., a corporation of New York Application June 18, 1958, Serial No. 742,782

25 Claims. (Cl. 93—1)

This invention relates to apparatus for forming and positioning parts manufactured of pliable material such as plastic and more particularly to such apparatus which is especially well suited for forming parts from a continuous web of plastic and positioning the same.

There has been developed a file separator having a transparent label holder affixed thereto which supports a label or index slip bearing suitable indicia so positioned that the indicia is readily visible from a point either in the same horizontal plane as the transparent holder or from above. Heretofore, difficulties have been encountered in providing apparatus suitable for forming and positioning such holders on an index card or file folder. The manufacture of such articles has proven to be relatively difficult and excessive time was required to provide a desirable product without an excessive wastage of materials.

One general object of this invention, therefore, is to provide new and improved apparatus for forming and positioning parts manufactured of pliable material which is particularly adaptable for forming and attaching label holders to index separators and the like as used in filing systems.

It is an additional object of this invention to rapidly, accurately and automatically position a piece of material in a die or other stamping or forming apparatus.

More specifically, it is an object of this invention to facilitate the manufacture of label holders and index separators for filing systems.

Another object of this invention is to insure a uniform and smooth adhesion between materials to be sealed together.

Still another object of the invention is to provide a forming and positioning apparatus utilizing comparatively simple mechanical elements, which apparatus is economical to manufacture and thoroughly reliable in operation.

In one illustrative embodiment of this invention, the pliable material is shaped in a preliminary way while fed to a transporter which also functions as a die member, conveniently designated as a male die member. The material is cut to provide a work piece of appropriate length. Upon actuation, the male die member transports the work into a position where it is shaped by the action of a female die coacting with the male die member and is attached to a suitable support, in the present instance a card in the form of an index separator. Preferably, the female die comprises two die members, one mounted on and movable with respect to a second and adapted to engage the work piece in advance of the second female die member and at least partially conform the work piece to the male die member. The second female die member may complete the shaping of the work piece and secure it to the index separator.

The present invention as well as further objects and features thereof will be understood more clearly and fully from the following detailed description of a preferred embodiment thereof, when read in conjunction with the accompanying drawings, in which:

Figure 1 is a perspective view of a label holder affixed to an index card of a type the present invention is especially well suited for manufacturing;

Figure 2 is a perspective view of an apparatus, partially broken away for convenience, which is illustrative of a preferred embodiment of the invention;

Figure 6 is a sectional view taken along the line 6—6 in Figure 4;

Figure 7 is a bottom plan view of a guide member used to effect preliminary shaping of the material from which the tab forming work pieces are cut;

Figure 8 is a sectional view taken along the line 8—8 in Figure 7;

Figure 9 is a sectional view taken along the line 9—9 in Figure 8; and

Figure 10 is a sectional view taken along the line 10—10 in Figure 8.

Figure 3:
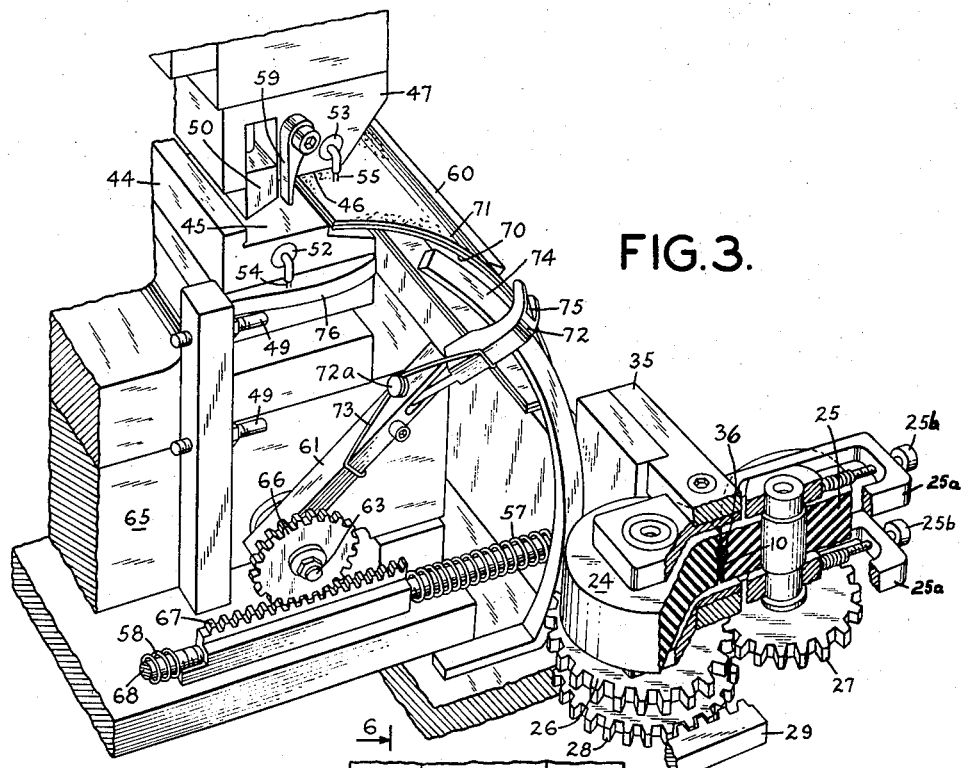
Figure 3 is a perspective fragmentary view thereof from a different point of view.

Referring initially to Figure 1 of the drawings, the present embodiment of the invention is best suited for use in forming and attaching a transparent label holder 10 to an index card 11 for providing a tabbed index separator adapted to be used in filing systems for the purpose of separating and indexing the contents of a particular file. Although the invention is hereinbelow described with reference to the transparent label holder and separator therefor shown in Figure 1, the invention has general application to material handling apparatus, and many other uses therefor will suggest themselves to those skilled in the art. A label 12 bearing the particular index numbers or letters is inserted into the label holder 10 where a portion thereof is positioned against the front face 13 of holder 10 to provide a convenient means for indentifying the file contents. The front face 13 is disposed at approximately a 45° angle with respect to the index card 11 so that the label therein is readily visible when viewed horizontally or from above. The holder 10 may conveniently be manufactured from a transparent plastic material such as Celluloid, acetate, etc., and incorporates a longitudinal fold 14 which is adapted to receive the edge of a raised portion 15 of the index card 11 and forms an abrupt edge on the upper surface of the holder 10. The front face 13 extends angularly from the fold 14 and has successive folds 16 and 17 at the lower edge thereof, from the latter of which a front flap 18 extends which may be adhesively or otherwise secured to the face of the index card 11. A back flap 19 extends from the fold 14 and may similarly be affixed to card 11. It will be readily apparent that a file folder or other separating means can be employed in place of the index card 11 to support the holder 10.

In order to facilitate an understanding of the apparatus, it may be noted with reference to Figure 2 that the transparent plastic material 21 in the form of a continuous web is drawn from a supply roll through a guide member 23 where preliminary folding of the material generally along a longitudinal axis is effected. The thus folded material is drawn between a pair of oppositely rotating presser rollers 24 and 25, due to rotation of the same, and fed past a cutting means, including the knife 37, onto a clip member 43a. Operation of the cutting means serves to sever from the web the piece 10 of material 21 on clip member 43a. A movable die member 60 transports the work from clip member 43a to a position between die members 44 and 47 and in so doing rotates the same through a 90° arc to facilitate insertion of a card 11 into the fold 14. The die member 47 is brought down upon the work to seal the thus formed flaps 18 and 19 to card 11, whereupon the completed work is withdrawn from the apparatus.

Referring now to Figures 2 through 10 of the drawings, the work piece handling apparatus may conveniently be mounted on a table or base 20 having the supply roll of transparent plastic material 21 associated therewith. Although for purpose of simplicity only a portion of base 20 has been illustrated in the drawings, it will be readily apparent that the base may normally be extended to support the roll of material 21 and other associated parts of the apparatus. In the illustrated embodiment the material 21 has been precoated with an adhesive 22 for the purpose of affixing the formed label holder 10 to its index card 11.

The transparent plastic material 21, from which the label holder 10 is formed, is led from the supply roll through guide member 23 and the opposed presser rollers 24 and 25, arranged in that sequence along a feed path defined thereby. Yokes 25a support the shafts of rollers 24 and 25 and are in turn supported by upper and lower support bars 35 secured to base 20. Adjusting screws 25b threaded in yokes 25a provide for adjustment of the position of the shaft of roller 25 when it is desired to vary the spacing between the rollers 24 and 25. Meshing spur gears 26 and 27 are fixed to the shafts of rollers 24 and 25 respectively. A pinion 28 is mounted on the shaft of roller 24 and is engaged by a rack 29 fixed to a piston rod 30 which in turn carries an air pressure operated piston 80 mounted for reciprocation in a cylinder 31.

Guide member 23, as shown most clearly in Figures 7–10, forms a relatively straight, horizontal infeed aperture 32 at the end thereof presented toward the supply of material 21 and an inverted, U-shaped discharge aperture 33 at the other end thereof. Channels 81 and 82 extend along opposite sides of guide member 23 and open at one end (Figure 9) to partially form infeed aperture 32. At their opposite or discharge end (Figure 10), channels 81 and 82 partially define the discharge aperture 33. In its passage through guide member 23, the plastic material is folded along its longitudinal axis partially forming the fold 14 as shown in Figure 10. Rigidly affixed upon the upwardly presented surface of guide member 23 (Figure 8) is an adjusting plate 34 having a pair of elongated holes 114 and 115 formed therein through which set screws 35a extend for adjustably connecting guide member 23 to upper bar 35 (Figure 2) affixed to base 20. An elongated member such as wire 36 extends from adjacent the infeed end of the guide member 23, out through the discharge aperture 33 and between the rollers 24 and 25 to a point just beyond the latter and short of the knife 37. The wire 36 is rigidly affixed at one end thereof to the guide member 23 by solder or other appropriate means and, as most clearly shown in Figure 8, extends spaced from and along the underside of guide member 23 so that the plastic material 21 may pass therebetween. Thus, as the plastic material is folded during its passage through guide member 23, it is folded about wire 36.

Figure 4:
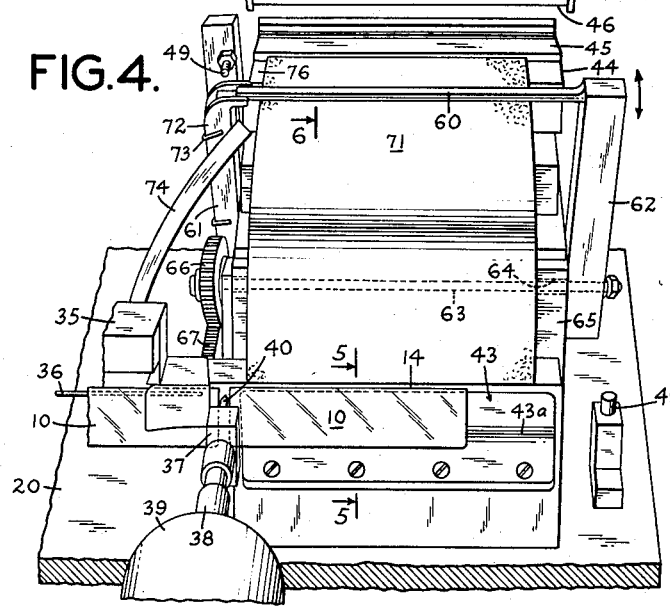
Figure 4 is a partial front view thereof.

As shown in Figures 2 and 4 of the drawings, the cutter or knife 37 is mounted on the outfeed side of the rollers 24 and 25 and is affixed to one end of a piston rod 38. The other end of rod 38 carries a piston 84 reciprocally mounted inside an air pressure operated cylinder 39 secured to the base 20. The knife 37 is provided with a cutting edge 40 which in the present instance has curved portions 41 in order to provide rounded edges on the label holder 10 such as the edges shown at 42 in Figure 1. Air hoses 85 and 86 are connected between the cylinder 39 and a control valve 87 which may be operated by means of a solenoid winding 88 supplied with electrical current through conductors 89 and 90. Control valve 87 communicates through conduit 91 with a source of air under pressure and through conduit 92 with the atmosphere.

Figure 5:
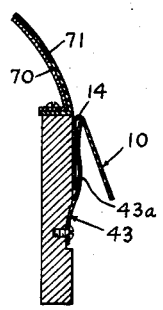
Figure 5 is a fragmentary sectional view taken along the line 5—5 in Figure 4.

As most clearly shown in Figures 4 and 5, an upstanding support member 43, of which bars 35 form a lateral extension, is positioned along the feed path of the plastic material on the side of cutter 40 away from rollers 24 and 25. The support member 43 has a bowed clip 43a mounted on the front face thereof in position to receive the folded material 21 as it is fed past cutter 37. As most clearly shown in Figure 5, the upper edge of clip 43a nests in the fold 14 of the piece 10 of material 21 with the front and back portions of the material on opposite sides of clip 43a.

A first die member 44 is mounted on a support 65 fixed to base 20 and is positioned above and behind support member 43. Fixed die member 44 has an upwardly presented flat surface 45 which terminates rearwardly in a raised portion 45a which together form a longitudinal notch to receive the fold 14 of a tab 10. A second die member 47 is movably mounted on vertical guide shafts 48 and extends above die member 44. A piston rod 93 is fastened at one end to die member 47 and at the other end to a piston 94 which is mounted for reciprocal movement inside a pressure-operated air cylinder 116. Air hoses 95 and 96 extend from the opposite ends of cylinder 116 to a valve 97 communicating through conduit 98 with a source of air under pressure and through conduit 99 with the atmosphere. The valve 97 may be conveniently controlled by means of a solenoid winding 100 supplied with electrical current through conductors 101 and 102.

The surface 46 of die member 47 is presented downwardly toward surface 45 of die member 44 and has a longitudinally extending channel 46a formed therein. A die piece 50 is vertically slidable in channel 46a and is supported by a pair of pins 50a, only one of which is shown in Figure 6. Pins 50a extend through and are slidable in holes formed in die member 47 and each has a head 50b bearing against a spring 51. Springs 51 serve to resiliently bias die piece 50 downwardly so that with die member 47 raised, heads 50b bottom against die member 47 and die piece 50 projects from channel 46a. Electrical heating coils 52 and 53 are respectively mounted in channels formed therefor in die members 44 and 47 and are connected to a source of electrical current through conductors 54 and 55 as indicated in Figure 2.

Referring now to Figures 2, 3 and 4 of the drawings, male die member 60 functions as a transporter for the work and is fixed to the free end of an arm 62, the other end of which is fixed to the right end (Figure 4) of a shaft 63 which is rotatably mounted in a bore 64 extending through die support member 65 on the base 20. A second arm 61 as well as a pinion 66 are keyed or otherwise secured to the opposite or left end of the shaft 63. Pinion 66 is positioned in meshing engagement with a reciprocating rack 67. A rod 68 extends from the opposite ends of rack 67 and carries cushioning springs 57 and 58. One end of rod 68 may pass through an aperture formed in support member 43 which serves as a stop for spring 57. The other end of rod 68 carries a piston 103 which is disposed inside an air cylinder 69. Positioned at opposite ends of the cylinder 69 are two air hoses 104 and 105 which communicate respectively with air hoses 106 and 107. Conduits 106 and 107 communicate with the opposite ends of cylinder 31 and with a solenoid operated air valve 108 which in turn communicates through conduit 109 with a source of air under pressure and through conduit 110 with the atmosphere. The valve 108 may be conveniently controlled by a solenoid winding 111 which is supplied with electrical current through conductors 112 and 113 and is controlled by switch 111a.

An arcuate plate 70 is connected to the upwardly presented surface of support member 43 and extends to adjacent surface 45 of die member 44. In the present instance, the forwardly presented surface of plate 70, as viewed in Figure 4, is covered with a relatively soft material such as felt padding 71. The curvature of plate 70 and the surface of padding 71 affixed thereto is such as to conform closely with the arcuate path traveled by male die member 60 as the latter travels through substantially a 90° arc upon rotation of its shaft 63. As shown most clearly in Figure 5, clip 43a has its upwardly presented edge substantially in alignment with the lower end of the arcuate surface formed by plate 70.

Arm 61 is somewhat shorter than arm 62 and carries, at its free end, a hinged arm section 72 pivotally mounted on a pin 72a carried by arm 61. Spring 73 anchored to pin 72a and engaging both arm 61 and hinged arm section 72 serves to resiliently bias the arm section 72 so that its free end may receive the free end of male die member 60 as shown in Figure 4. For this purpose the free end portion 75 of arm section 72 is provided with a channel shape and, as will be more fully pointed out hereinafter, serves to locate the work piece or label holder 10 accurately upon male die member 60. An inclined guide member 74 is supported on base 20 and is positioned to engage hinged arm section 72 during the major portion of the arc through which it travels due to rotation of shaft 63. As shown in Figure 3, continued rotation of arm 61 in a counter-clockwise direction will cause arm section 72, under the influence of spring 73, to move inwardly to coact with male die member 60 as shown in Figure 4. Further counter-clockwise rotation of arm 61 carries hinged arm section 72 into engagement with cam surface 76 on die member 44. Thus, as male die member 60 approaches the opening between die members 44 and 47, arm section 72 engages cam 76 and is forced outward away from male die member 60.

As indicated in Figure 2, switches 88a, 100a and 111a are connected in a circuit with windings 88, 100 and 111 respectively. Closing switch 88a serves to energize winding 88 which in turn shifts valve 87 so that air pressure conduit 91 communicates with the right hand end of cylinder 39 through conduit 86 to thereby drive piston 84 and its piston rod 38 to the left, conduit 85 being at the same time placed in communication with the atmosphere through conduit 92. When switch 88a is opened, the armature is free to return to its normal position under the influence of a spring (not shown), thereby connecting conduit 85 with air pressure conduit 91 and conduit 86 with vent conduit 92 so that piston 84 is driven to the right and cutter 37 is withdrawn from the path of the work. Similarly, closing of switch 100a serves to energize winding 100 and thereby provide air pressure on top of piston 94 to drive the same and die member 47, connected thereto, downward. Die member 47 is returned to its raised position when switch 100a is opened due to the communication of the air pressure supply through conduit 98, valve 97 and conduit 96 to the underside of piston 94, conduit 95 now being placed in communication with the atmosphere through conduit 99. If desired, valves 87 and 97 may be replaced by a single valve and switch which control the operation of both cutter 37 and die member 47. If desired, springs (not shown) which cushion the forward stroke of cutter 37 may be additionally utilized to return the cutter and die member to their respective retracted positions.

When switch 111a is closed, winding 111 is energized and its armature adjusts valve 108 so that conduit 106 communicates with conduit 109 while conduit 107 communicates with conduit 110. Air under pressure is introduced into the left end (Figure 2) of cylinder 31 and through conduit 104 into the corresponding end of cylinder 69. This serves to drive both the racks 29 and 67 to the right or forward. Opening switch 111a shifts valve 108 to reverse the connection of conduits 106 and 107 so that each is connected to conduits 110 and 109 respectively.

As has already been indicated, rack 29, during its forward stroke, rotates pinion 28 counter-clockwise. At the same time that air pressure is admitted behind piston 80 connected to rack 29, air under pressure is also admitted behind piston 103 connected to rack 67. However, the substantially greater resistance provided by rollers 25 and 26 to forward motion of rack 29 than is provided by rotation of pinion 66 and arms 61, 62 to forward motion of rack 67, insures that die member 60 is rotated to carry a work piece from clip 43a so that the latter is clear and ready to receive the work as it is fed thereto by rollers 25 and 26.

As shown most clearly in Figure 3, rollers 24 and 25 each have surfaces formed of suitable resilient material such as rubber or the like. These rollers are so spaced that they engage the work material therebetween with sufficient force so as to feed the work material through the nip which they form between them and at the same time deform the material permanently. As has already been indicated, wire member 36 extends between rollers 24 and 25 and, because of the resilient nature of the material forming the juxtaposed surfaces of the rollers, the roller surfaces readily conform themselves and the work material to the shape of wire member 36. Wire member 36 functions to prevent the work material 21 from being so sharply creased under the pressure exerted by rollers 24 and 25 that the material cracks or may be readily torn. The diameter of wire member 36 is such that when the material 21 is conformed around it by rollers 24 and 25, the resulting fold 14 formed thereby is suitable for receiving the edge of card 11 as shown in Figures 1 and 6. Wire member 36 terminates short of the cutting means 37. Thus, as the work is fed along its path by rollers 24 and 25, it passes beyond wire member 36, past cutting means 37 and onto clip 43a.

When the apparatus is first put into operation, switches 88a, 100a and 111a are open. Heating means 52 and 53 for die members 44 and 47 are energized so as to bring the die members to the desired temperature. Similarly, heating lamp 77 operated by a source of electrical current through conductors 78 and 79 is also energized to warm the work material 21. The work material 21 is then threaded through die member 23 into the nip of rollers 24 and 25. At this time die member 60 is in its lowermost position adjacent to clip 43a and below the position occupied by a work piece 10 when the latter is engaged by clip 43a. A stop 49' may be provided adjacent the arm section 62 in order to accurately predetermine the lowermost position of die member 60. Now when switch 111a is closed, clip 43a being empty, die member 60 is rotated by arms 61 and 62 and carried along the arcuate surface of plate 70 to its position under die member 47, where its motion may be arrested by means of adjustable stops 49. At the same time rollers 24 and 25 are rotated due to the forward motion of rack 29 and the work material is simultaneously deformed and fed by the rollers along its path. Depending upon the size and spacing of the various parts, one or more forward strokes of rack 29 may be required before a length of the work material is fed during the last forward stroke of rack 29 onto clip 43a.

While not shown in the drawing, it is to be understood that pinion 28, engaged by rack 29, transmits motion to gear 26 through a conventional clutch mechanism. Thus, gear 26 is rotated counter-clockwise, as viewed in Figure 3, during the forward stroke of rack 29 but remains motionless during the rearward stroke of rack 29.

When a length of work material 21 which has thus been shaped and formed has been fed past knife 37 on to clip 43a, switch 88a is closed thereby causing knife 37 to be driven forward and cut the work material 21 so that a work piece 10 is now in position on clip 43a. Switch 88a is opened to retract knife 37 out of the feed path of the work material. During this initial start-up procedure there will be no work piece about the die member 60 between die members 44 and 47. Therefore, switch 100a is not closed at this time. Switch 111a is opened and both the racks 29 and 67 are retracted to their rearward positions. The motion of rack 67 is transmitted to die member 60 and the latter is carried past the work piece 10 now on clip 43a to its position just below the same. In passing clip 43a, die member 60 deflects a portion of work piece 10 out of its path and this deflected portion of work piece 10, as soon as die member 60 has passed the same, springs back so as to extend across the path traveled by die member 60.

From this point on the apparatus is in condition to go repeatedly through its normal cycle of operation, as will now be described. Racks 29 and 67 are again energized and driven forwardly by the closing of switch 111a. Die member 60 is rotated counter-clockwise, as viewed in Figure 2. Because of the greater resistance opposing forward motion of rack 29, it lags behind rack 67, and die member 60, in its travel, engages and removes the work piece 10 from clip 43a before the leading edge of the work material 21, being fed by rollers 24 and 25, arrives at the left hand end of clip 43a. Thus, as die member 60 completes its travel to be positioned, with the work piece 10 extending thereabout, between die members 44 and 47, rollers 24 and 25 continue to feed the work material and position a length thereof on the clip member 43a. On the completion of the forward strokes of racks 29 and 67 rollers 24 and 25 as well as die member 60 come to rest.

At this point switches 88a and 100a, controlling respectively the actuation of the cutter means and the die means, may now be closed simultaneously or in any desired sequence. Closing of switch 88a results in the cutting of the work material so that a work piece 10 is again positioned on clip 43a. Before switch 100a is closed, a support such as a card 11 is inserted between die members 44 and 47, between the lower surface of die member 60, and the portion of work piece 10 juxtaposed thereto. The edge of card 11 is positioned in the fold 14 of work piece 10. When switch 100a is closed, die member 47 is forced downward. Work piece 10 is conformed to the upper surface of die member 60 and the adhesive 22 is heated so that the work piece is affixed to opposite surfaces of card 11.

Again, operation of switches 88a and 100a may be effected simultaneously or in any desired sequence to effect retraction of the cutting means and the die means. Upon opening of switch 100a die member 47 is raised and card 11 with the work piece or tab 10 affixed thereto is withdrawn.

Opening of switch 111a again results in the retraction of racks 29 and 67, die member 60 being returned to its lowermost position adjacent to clip 43a and rollers 24 and 25 remaining motionless. Operation of the apparatus continues as has already been described by operating the various switches in the sequence indicated.

It will be recognized that operation of cutting means 37 to sever the work while a length thereof is positioned on clip 43a leaves a short length of the work material which overhangs the left hand end of clip 43a. The operation of hinged arm section 72, as will now be described, insures that the entire length of the work piece is properly positioned upon die member 60. As has already been indicated, arm 61 is fixed on shaft 63 and rotates in alignment with arm 62. With arms 61 and 62 and die member 60 in their lowermost position, hinged arm section 72 is engaged by guide member 74 and is maintained pivoted about its hinged pin 72a so that it is behind the feed path of work material 21 and laterally removed from die member 60. During the upward travel of die member 60 about guide plate 70, arm section 72 rides along and, under the influence of its spring 73, follows the inclination of guide member 74 so that the upper end 75 thereof approaches the free end of die member 60. As shown in Figure 4, the open end of arm section 72 laps with the end portion of die member 60 before the latter reaches die members 44 and 47 and moves the work piece 10 positioned on the die member 60 to the right as viewed in Figure 4. Thus, when die member 60 arrives under die member 47 work piece 10 is already accurately positioned upon die member 60. In the illustrated embodiment stop members 59 have been provided to assist in maintaining work piece 10 in this position. Also, cam 76 shifts arm section 72 away from the free end portion of die member 60 so that the end of arm section 72 does not extend between die members 44 and 47.

When, as has been described, die member 47 is forced toward the work the downwardly presented surface of die piece 50 is well in advance of the surface 46 of die member 47 and engages the portion 13 of work piece 10 closely adjacent to the fold 14 and smoothly conforms said portion to the upwardly presented surface of die member 60. Engagement of die piece 50 with the work arrests its downward motion and, as die member 47 continues downward, it conforms the work to the vertical surface of die member 60 and to the horizontal surface of card 11, as is best shown in Figure 6.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for shaping pliable material and affixing the same to a support, comprising first means for receiving a continuous web of pliable material from a supply thereof and shaping and feeding the same along a path, first die means spaced from said first means and adapted to receive said material and a support and to affix said material to said support, second die means mounted for displacement between two extreme positions with said second die means in one of its said positions being adjacent to said first means and in the other of said positions being juxtaposed with said first die means, severing means intermediate said first means and said one position for cutting said continuous web to form work pieces therefrom, said second die means in its movement from its said one position to its said other position being adapted to engage a severed work piece and carry the same into juxtaposition with said first die means, said first die means being adapted to conform a portion of said work piece about a portion of said second die means, and means for actuating said first die means, with said second die means and the work piece engaged thereby in juxtaposition therewith, to shift said first die means toward said portion of said work piece and thereby conform the same about said portion of said second die means while affixing the work piece to said support.

2. An apparatus for shaping pliable material and affixing the same to a support, comprising first means for receiving a continuous web of pliable material from a supply thereof and shaping and feeding the same along a path to a predetermined position, said first means being adapted to form a fold in said material with said fold opening in a predetermined direction relative to said predetermined position, first die means spaced from said first means and adapted to receive said material and affix the same to a support, second die means mounted for displacement between a first and second position with said second die means in its said first position being adjacent to said predetermined position on the side thereof toward which said fold opens and in its said second position being juxtaposed with said first die means, means for severing the material in said predetermined position from said web to thereby form a work piece, said second die means in its movement from its said first position to its said second position being adapted to engage the fold of a severed work piece and carry the same into juxtaposition with said first die means, said first die means being adapted to conform a portion of said work piece about a portion of said second die means, and means for actuating said first die means, with said second die means and the work piece engaged thereby in juxtaposition therewith, to conform said portion of said work piece about said portion of said second die means while affixing the work piece to said support.

3. An apparatus for shaping pliable material and affixing the same to a support, comprising first means for receiving a continuous web of pliable material from a supply thereof and shaping and feeding the same along a path to a predetermined position, said first means including presser means and an elongated member extending in said presser means along said path, said presser means being adapted to form a fold in said material about said elongated member with said fold opening in a predetermined direction relative to said predetermined position, first die means spaced from said first means and adapted to receive said material and affix the same to a support, second die means mounted for displacement between a first and second position with said second die means in its said first position being adjacent to said predetermined position on the side thereof toward which said fold opens and in its said second position being juxtaposed with said first die means, means for severing the material in said predetermined position from said web to thereby form a work piece, said second die means in its movement from its said first position to its said second position being adapted to engage the fold of a severed work piece and carry the same into juxtaposition with said first die means, said first die means being adapted to conform a portion of said work piece about a portion of said second die means, and means for actuating said first die means, with said second die means and the work piece engaged thereby in juxtaposition therewith, to conform said portion of said work piece about said portion of said second die means while affixing the work piece to said support.

4. An apparatus for shaping pliable material and affixing the same to a support, comprising first means for receiving a continuous web of pliable material from a supply thereof and shaping and feeding the same along a path to a predetermined position, said first means being adapted to form a fold in said material with said fold opening in a predetermined direction relative to said predetermined position, first die means spaced from said first means and adapted to receive said material and affix the same to a support, second die means mounted for displacement between a first and second position with said second die means in its said first position being adjacent to said predetermined position on the side thereof toward which said fold opens and in its said second position being juxtaposed with said first die means, means for severing the material in said predetermined position from said web to thereby form a work piece, said second die means in its movement from its said first position to its said second position being adapted to engage the fold of a severed work piece and carry the same into juxtaposition with said first die means, said first die means being adapted to conform a portion of said work piece about a portion of said second die means, said first die means including a die member having a channel formed therein and a die piece movably mounted in said channel, resilient means normally biasing said die piece so that it extends from said channel toward said second position, said die piece having its surface presented toward said second position shaped to conform with said portion of said second die means, and means for actuating said first die means, with said second die means and the work piece engaged thereby in juxtaposition therewith, to conform said portion of said work piece about said portion of said second die means while affixing the work piece to said support.

5. An apparatus for shaping pliable material and affixing the same to a support, comprising first means for receiving a continuous web of pliable material from a supply thereof and shaping and feeding the same along a path to a predetermined position, said first means including presser means and an elongated member extending in said presser means along said path, said presser means being adapted to form a fold in said material about said elongated member with said fold opening in a predetermined direction relative to said predetermined position, first die means spaced from said first means and adapted to receive said material and affix the same to a support, second die means mounted for displacement between a first and second position with said second die means in its said first position being adjacent to said predetermined position on the side thereof toward which said fold opens and in its said second position being juxtaposed with said first die means, means for severing the material in said predetermined position from said web to thereby form a work piece, said second die means in its movement from its said first position to its said second position being adapted to engage the fold of a severed work piece and carry the same into juxtaposition with said first die means, said first die means being adapted to conform a portion of said work piece about a portion of said second die means, said first die means including a die member having a channel formed therein and a die piece movably mounted in said channel, resilient means normally biasing said die piece so that it extends from said channel toward said second position, said die piece having its surface presented toward said second position shaped to conform with said portion of said second die means, and means for actuating said first die means, with said second die means and the work piece engaged thereby in juxtaposition therewith, to conform said portion of said work piece about said portion of said second die means while affixing the workpiece to said support.

6. An apparatus for shaping pliable material and affixing the same to a support, comprising first means for receiving a continuous web of pliable material from a supply thereof and shaping and feeding the same along a path to a predetermined position, said first means including presser means and an elongated member extending in said presser means along said path, said presser means being adapted to form a fold in said material about said elongated member with said fold opening in a predetermined direction relative to said predetermined position, first die means spaced from said first means and adapted to receive said material and affix the same to a support, second die means mounted for displacement through an arcuate path between a first and second position with said second die means in its said first position being adjacent to said predetermined position on the side thereof toward which said fold opens and in its said second position being juxtaposed with said first die means, means for severing the material in said predetermined position from said web to thereby form a work piece, said second die means in its movement from its said first position to its said second position being adapted to engage the fold of a severed work piece and carry the same into juxtaposition with said first die means while simultaneously rotating said work piece through an arc, said first die means being adapted to conform a portion of said work piece about a portion of said second die means, said first die means including a die member having a channel formed therein and a die piece movably mounted in said channel, resilient means normally biasing said die piece so that it extends from said channel toward said second position, said die piece having its surface presented toward said second die means, and means for actuating said first die means, with said second die means and the work piece engaged thereby in juxtaposition therewith, to conform said portion of said work piece about said portion of said second die means while affixing the work piece to said support.

7. An apparatus for shaping pliable material and affixing the same to a support, comprising guide means adapted to receive a continuous web of pliable material from a supply thereof and longitudinally bend the same, presser means for intermittently drawing said web through said guide means and permanently deforming the web along said bend to form a fold therein while feeding the same to a predetermined position, first die means spaced from said presser means and adapted to receive said material and affix the same to a support, second die means mounted for displacement between a first and second position with said second die means in its said first position being adjacent to said predetermined position on the side thereof toward which said fold opens and in its said second position being juxtaposed with said first die means, means for severing the material in said predetermined position from said web to thereby form a work piece, said second die means in its movement from its said first position to its said second position being adapted to engage the fold of a severed work piece and carry the same into juxtaposition with said first die means, said first die means being adapted to conform a portion of said work piece about a portion of said second die means, and means for actuating said first die means, with said second die means and the work piece engaged thereby in juxtaposition therewith, to conform said portion of said work piece about said portion of said second die means while affixing the work piece to said support.

8. An apparatus for shaping pliable material and affixing the same to a support, comprising an elongated member, guide means adapted to receive a continuous web of pliable material from a supply thereof and longitudinally bend the same about said elongated member, presser means for intermittently drawing said web through said guide means along said elongated member and permanently deforming the web along said bend and about said elongated member to form a fold therein while feeding the same to a predetermined position, first die means spaced from said presser means and adapted to receive said material and affix the same to a support, second die means mounted for displacement between a first and second position with said second die means in its said first position being adjacent to said predetermined position on the side thereof toward which said fold opens and in its said second position being juxtaposed with said first die means, means for severing the material in said predetermined position from said web to thereby form a work piece, said second die means in its movement from its said first position to its said second position being adapted to engage the fold of a severed work piece and carry the same into juxtaposition with said first die means, said first die means being adapted to conform a portion of said work piece about a portion of said second die means, and means for actuating said first die means, with said second die means and the work piece engaged thereby in juxtaposition therewith, to conform said portion of said work piece about said portion of said second die means while affixing the work piece to said support.

9. An apparatus for shaping pliable material and affixing the same to a support, comprising an elongated member, guide means adapted to receive a continuous web of pliable material from a supply thereof and longitudinally bend the same about said elongated member, presser means including a pair of rollers for intermittently drawing said web through said guide means along said elongated member and permanently deforming the web along said bend and about said elongated member to form a fold therein while feeding the same to a predetermined position, said elongated member extending between said rollers but terminating short of said predetermined position, first die means spaced from said presser means and adapted to receive said material and affix the same to a support, second die means mounted for displacement between a first and second position with said second die means in its said first position being adjacent to said predetermined position on the side thereof toward which said fold opens and in its said second position being juxtaposed with said first die means, means for severing the material in said predetermined position from said web to thereby form a work piece, said second die means in its movement from its said first position to its said second position being adapted to engage the fold of a severed work piece and carry the same into juxtaposition with said first die means, said first die means being adapted to conform a portion of said work piece about a portion of said second die means, and means for actuating said first die means, with said second die means and the work piece engaged thereby in juxtaposition therewith, to conform said portion of said work piece about said portion of said second die means while affixing the work piece to said support.

10. An apparatus for shaping pliable material and affixing the same to a support, comprising an elongated member, guide means adapted to receive a continuous web of pliable material from a supply thereof and longitudinally bend the same about said elongated member, presser means including a pair of rollers for intermittently drawing said web through said guide means along said elongated member and permanently deforming the web along said bend and about said elongated member to form a fold therein while feeding the same to a predetermined position, said elongated member extending between said rollers but terminating short of said predetermined position, first die means spaced from said presser means and adapted to receive said material and affix the same to a support, second die means mounted for displacement between a first and second position with said second die means in its said first position being adjacent to said predetermined position on the side thereof toward which said fold opens and in its said second position being juxtaposed with said first die means, means for severing the material in said predetermined position from said web to thereby form a work piece, said second die means in its movement from its said first position to its said second position being adapted to engage the fold of a severed work piece and carry the same into juxtaposition with said first die means, said first die means being adapted to conform a portion of said work piece about a portion of said second die means, said first die means including a die member having a channel formed therein and a die piece movably mounted in said channel, resilient means normally biasing said die piece so that it extends from said channel toward said second position, said die piece having its surface presented toward said second position shaped to conform with said portion of said second die means, and means for actuating said first die means, with said second die means and the work piece engaged thereby in juxtaposition therewith, to conform said portion of said work piece about said portion of said second die means while affixing the work piece to said support.

11. An apparatus for shaping pliable material and affixing the same to a support, comprising an elongated member, guide means adapted to receive a continuous web of pliable material from a supply thereof and longitudinally bend the same about said elongated member, presser means including a pair of rollers for intermittently drawing said web through said guide means along said elongated member and permanently deforming the web along said bend and about said elongated member to form a fold thereon while feeding the web to a predetermined position, said elongated member extending between said rollers but terminating short of said predetermined position, first die means spaced from said presser means and adapted to receive said material and affix the same to a support, second die means mounted for displacement through an arcuate path between a first and a second position with said second die means in its said first position being adjacent to said predetermined position on the side thereof toward which said fold opens and in its said second position being juxtaposed with said first die means, said second die means having a pivotally mounted arm portion associated therewith, means for severing the material in said predetermined position from said web to thereby form a work piece, said second die means in its movement from its said first position to its said second position being adapted to engage the fold of a severed work piece and carry the same into juxtaposition with said first die means while simultaneously rotating said work piece through an arc, said first die means being adapted to conform a portion of said work piece about a portion of said second die means, said first die means including a die member having a channel formed therein and a die piece movably mounted in said channel, first resilient means normally biasing said die piece so that it extends from said channel toward said second position, said die piece having its surface presented toward said second position shaped to conform with said portion of said second die means, second resilient means normally biasing said arm portion so that it extends toward said second die means, a guide member for maintaining said arm portion away from said second die means when in said first position and for permitting movement of said arm portion toward said second die means during displacement thereof from said first position to said second position, said arm portion being adapted to engage a work piece during said displacement to urge the same toward said second die means, and means for actuating said first die means, with said second die means and the work piece engaged thereby in juxtaposition therewith, to conform said portion of said work piece about said portion of said second die means while affixing the work piece to said support.

12. An apparatus for shaping pliable material and affixing the same to a support, comprising a wire, elongated guide means adapted to receive a continuous web of pliable material from a supply thereof, said guide means including longitudinally extending channels for accommodating said material and for partially defining a substantially straight infeed aperture at one end of said guide means and a U-shaped outfeed aperture at the other end of said guide means to longitudinally bend said material about said wire, the legs of said U-shaped outfeed aperture extending in a direction transverse to that of said infeed aperture, presser means including a pair of oppositely rotatable rollers for intermittently drawing said web through said apertures along said wire and permanently deforming the web along said bend and about said wire to form a fold thereon while feeding the web to a predetermined position, said wire extending between said rollers but terminating short of said predetermined position, first die means spaced from said presser means and including a first and a second die member having a pair of oppositely disposed parallel surfaces thereon for receiving said material and affixing the same to a support, means for heating said first die means, second die means pivotally mounted for displacement through an arcuate path between a first and a second position with said second die means in its said first position being adjacent to said predetermined position on the side thereof toward which said fold opens and in its said second position being juxtaposed with said first die means between said surfaces, said second die means having a pivotally mounted arm portion associated therewith, means for severing the material in said predetermined position from said web to thereby form a work piece, said second die means in its movement from its said first position to its said second position being adapted to engage the fold of a severed work piece and carry the same into juxtaposition with said first die means between said surfaces while simultaneously rotating said work piece through an arc, said first die means being adapted to conform a portion of said work piece about a portion of said second die means, one of said die members having a channel formed in the surface thereof and a die piece movably mounted in said channel, first resilient means normally biasing said die piece so that it extends from said channel toward said second position, said die piece having its surface presented toward said second position shaped to conform with said portion of said second die means, second resilient means normally biasing said arm portion so that it extends toward said second die means, a guide member for maintaining said arm portion away from said second die means when in said first position and for permitting movement of said arm portion toward said second die means during displacement thereof from said first position to said second position, said arm portion being adapted to engage a work piece during said displacement to urge the same toward said second die means, and means for actuating said first die means, with said second die means and the work piece engaged thereby in juxtaposition therewith, to provide initial engagement between said die piece and said work piece and to provide subsequent engagement between said parallel surfaces and said work piece for conforming said portion of said work piece about said portion of said second die means while affixing the work piece to said support.

13. In an apparatus for shaping pliable material, means for feeding pliable material from a supply thereof along a predetermined path, first die means mounted along said path and adapted to receive said material, second die means mounted for displacement between two extreme positions with said second die means in one of its said positions being adjacent to said feeding means and in the other of said positions being juxtaposed with said first die means, said second die means in its movement from its said one position to its said other position being adapted to engage the material fed by said feeding means and carry the same into juxtaposition with said first die means, said first die means being adapted to conform a portion of said material about a portion of said second die means, and means for actuating said first die means, with said second die means and the material engaged thereby in juxtaposition therewith, to shift said first die means toward said portion of said material and thereby conform the same about said portion of said second die means.

14. In an apparatus for shaping pliable material, means for feeding pliable material from a supply thereof along a predetermined path, first die means mounted along said path and adapted to receive said material, second die means mounted for displacement between a first and second position with said second die means in its said first position being adjacent to said feeding means and in its second position being juxtaposed with said first die means, said second die means in its movement from its first position to its said second position being adapted to engage the material fed by said feeding means and carry the same into juxtaposition with said first die means, said first die means being adapted to conform a portion of said material about a portion of said second die means, said first die means including a die member having a channel formed therein and a die piece movably mounted in said channel, resilient means normally biasing said die piece so that it extends from said channel toward said second position, said die piece having its surface presented toward said second position shaped to conform with said portion of said second die means, and means for actuating said first die means, with said second die means and the material engaged thereby in juxtaposition therewith, to conform said portion of said material about said portion of said second die means.

15. In an apparatus for shaping pliable material, means for feeding pliable material from a supply thereof along a predetermined path, first die means mounted along said path and adapted to receive said material, second die means pivotally mounted for displacement through an arcuate path between a first and second position with said second die means in its said first position being adjacent to said feeding means and in its second position being juxtaposed with said first die means, said second die means having a pivotally mounted arm portion associated therewith, said second die means in its movement from its said first position to its said second position being adapted to engage the material fed by said feeding means and carry the same into juxtaposition with said first die means while simultaneously rotating said material through an arc, said first die means being adapted to conform a portion of said material about a portion of said second die means, said first die means including a die member having a channel formed therein and a die piece movably mounted in said channel, first resilient means normally biasing said die piece so that it extends from said channel toward said second position, said die piece having its surface presented toward said second position shaped to conform with said portion of said second die means, second resilient means normally biasing said arm portion so that it extends toward said second die means, a guide member for maintaining said arm portion away from said second die means when in said first position and for permitting movement of said arm portion toward said second die means during displacement thereof from said first position to said second position, said arm portion being adapted to engage the material during said displacement to urge the same toward said second die means, and means for actuating said first die means, with said second die means and the material engaged thereby in juxtaposition therewith, to conform said portion of said material about said portion of said second die means.

16. In an apparatus for shaping pliable material, means for feeding pliable material from a supply thereof along a predetermined path, first die means mounted along said path and including a first and a second die member having a pair of oppositely disposed parallel surfaces thereon for receiving said material, means for heating said first die means, second die means pivotally mounted for displacement through an arcuate path between a first and second position with said second die means in its said first position being adjacent to said feeding means and in its second position being juxtaposed with said first die means between said surfaces, said second die means having a pivotally mounted arm portion associated therewith, said second die means in its movement from its said first position to its said second position being adapted to engage the material fed by said feeding means and carry the same into juxtaposition with said first die means while simultaneously rotating said material through an arc, said first die means being adapted to conform a portion of said material about a portion of said second die means, one of said die members having a channel formed in the surface thereof and a die piece movably mounted in said channel, first resilient means normally biasing said die piece so that it extends from said channel toward said second position, said die piece having its surface presented toward said second position shaped to conform with said portion of said second die means, second resilient means normally biasing said arm portion so that it extends toward said second die means, a guide member for maintaining said arm portion away from said second die means when in said first position and for permitting movement of said arm portion toward said second die means during displacement thereof from said first position to said second position, said arm portion being adapted to engage the material during said displacement to urge the same toward said second die means, and means for actuating said first die means, with said second die means and the material engaged thereby in juxtaposition therewith, to provide initial engagement between said die piece and said material and to provide subsequent engagement between said parallel surfaces and said material for conforming said portion of said material about said portion of said second die means.

17. An apparatus for shaping pliable material and affixing the same to a support, comprising first means for receiving a continuous web of pliable material from a supply thereof and shaping and feeding the same along a path to a predetermined position, said first means being adapted to form a fold in said material with said fold opening in a predetermined direction relative to said predetermined position, die means spaced from said first means and adapted to receive said material and affix the same to a support, transport means mounted for displacement between a first and a second position with said transport means in its said first position being adjacent to said predetermined position on the side thereof toward which said fold opens and in its said second position being juxtaposed with said die means, means for severing the material in said predetermined position from said web to thereby form a work piece, said transport means in its movement from its said first position to its said second position being adapted to engage the fold of a severed work piece and carry the same into juxtaposition with said die means, and means for actuating said die means, with said severed work piece and said support in juxtaposition therewith, to thereby affix said work piece to said support.

18. An apparatus for shaping pliable material and affixing the same to a support, comprising first means for receiving a continuous web of pliable material from a supply thereof and shaping and feeding the same along a path, said first means including presser means disposed along said path and adapted to form a fold in said material, first die means spaced from said first means and adapted to receive said folded material and affix the same to a support, second die means mounted for displacement between a first and a second position with said second die means in its said first position being remotely disposed with respect to said first die means and in its said second position extending in said fold and juxtaposed with said first die means, means for severing the material from said web to thereby form a work piece, said first die means being adapted to conform a portion of said work piece about a portion of said second die means when the latter is in its said second position, and means for actuating said first die means, with said second die means and the work piece engaged thereby in juxtaposition therewith, to conform said portion of said work piece about said portion of said second die means while affixing the work piece to said support.

19. An apparatus for shaping pliable material and affixing the same to a support, comprising first means for receiving a continuous web of pliable material from a supply thereof and shaping and feeding the same along a path to a predetermined position, said first means being adapted to form a fold in said material with said fold opening in a predetermined direction relative to said predetermined position, first die means spaced from said first means and adapted to receive said material and affix the same to a support, second die means mounted for displacement between a first and a second position with said second die means in its said first position being adjacent to said predetermined position on the side thereof toward which said fold opens and in its said second position being juxtaposed with said first die means, means for severing the material in said predetermined position from said web to thereby form a work piece, said second die means in its movement from its said first position to its said second position being adapted to engage the fold of a severed work piece at said predetermined position and carry the same into juxtaposition with said first die means, said first means having substantially greater resistance to motion than said second die means, first operating means for simultaneously applying substantially equal motive force to said first means and said second die means to thereby actuate the same with said first means being adapted to feed said web of material to said predetermined position subsequent to the time said severed work piece is carried therefrom by said second die means, and second operating means for actuating said first die means, with said second die means and the work piece engaged thereby in juxtaposition therewith, to conform a portion of said work piece about a portion of said second die means while affixing the work piece to said support.

20. An apparatus for shaping pliable material and affixing the same to a support, comprising an elongated member, guide means adapted to receive a continuous web of pliable material from a supply thereof and longitudinally bend the same about said elongated member, presser means including a pair of rollers for drawing said web through said guide means along said elongated member and permanently deforming the web along said bend and about said elongated member to form a fold therein while feeding the same to a predetermined position, die means spaced from said presser means and adapted to receive said material and affix the same to a support, transport means mounted for displacement between a first and a second position with said transport means in its said first position being adjacent to said predetermined position on the side thereof toward which said fold opens and in its said second position being juxtaposed with said die means, means for severing the material in said predetermined position from said web to thereby form a work piece, said transport means in its movement from its said first position to its said second position being adapted to engage the fold of a severed work piece at said predetermined position and carry the same into juxtaposition with said die means, said presser means having substantially greater resistance to motion than said transport means, first operating means for simultaneously applying substantially equal motive force to said presser means and said transport means to thereby actuate the same with said presser means being adapted to advance said web of material to said predetermined position subsequent to the time said severed work piece is carried therefrom by said transport means, and second operating means for actuating said die means, with said severed work piece and said support in juxtaposition therewith, to thereby affix said work piece to said support.

21. An apparatus for shaping pliable material and affixing the same to a support, comprising an elongated member, guide means adapted to receive a continuous web of pliable material from a supply thereof and longitudinally bend the same about said elongated member, presser means including a pair of rollers for drawing said web through said guide means along said elongated member and permanently deforming the web along said bend and about said elongated member to form a fold therein, first die means spaced from said presser means and adapted to receive said folded material and affix the same to a support, second die means mounted for displacement between a first and a second position with said second die means in its said first position being remotely disposed with respect to said first die means and in its said second position extending in said fold and juxtaposed with said first die means, means for severing the material from said web to thereby form a work piece, said first die means being adapted to conform a portion of said work piece about a portion of said second die means, said first die means including a die member having a channel formed therein and a die piece movably mounted in said channel, resilient means normally biasing said die piece so that it extends from said channel toward said second position, said die piece having its surface presented toward said second position shaped to conform with said portion of said second die means, and means for actuating said first die means, with said second die means and the work piece engaged thereby in juxtaposition therewith, to conform said portion of said work piece about said portion of said second die means while affixing the work piece to said support.

22. In an apparatus for shaping pliable material and affixing the same to a support, die means including a first and a second die member having a pair of oppositely disposed surfaces thereon for receiving said material and affixing the same to a support, one of said die members having an aperture formed in said surface thereof, a die piece movably mounted in said aperture, means for biasing said die piece so that it normally extends from said aperture toward said surface of the other of said die members, and means for actuating said die means, with said material and said support in juxtaposition therewith, to provide initial engagement between said die piece and said material and to provide subsequent engagement between said surface of said one die member and said material for shaping the material while affixing said material to said support.

23. In an apparatus for shaping pliable material and affixing the same to a support, die means including a first and a second die member having a pair of oppositely disposed parallel surfaces thereon for receiving said material and affixing the same to a support, one of said die members being movable with respect to the other die member and having a channel formed in said surface thereof, means for heating each of said die members, a die piece movably mounted in said channel, resilient means biasing said die piece so that it normally extends from said channel toward said surface of the other of said die members, and means for actuating said die means, with said material and said support in juxtaposition therewith, to provide initial engagement between said die piece and said material and to provide subsequent engagement between said surface of said one die member and said material for shaping the material while affixing said material to said support.

24. In an apparatus for shaping pliable material, elongated guide means adapted to receive a continuous web of pliable material from a supply thereof, said guide means defining an infeed aperture spaced from a U-shaped outfeed aperture, presser means including a pair of oppositely rotatable rollers disposed on the outfeed aperture side of said guide means and forming a nip therebetween for drawing said web through said guide means, and an elongated member extending in said guide means, through said outfeed aperture and in said nip, said presser means being adapted to draw said web through said apertures to longitudinally bend the web about said elongated member and to permanently deform said web along said bend to form a fold thereon.

25. In an apparatus for shaping pliable material, an elongated guide member adapted to receive a continuous web of pliable material from a supply thereof, said guide member including a pair of longitudinally extending channels for accommodating said material and for partially defining a substantially straight infeed aperture at one end of said guide member and a U-shaped outfeed aperture at the other end of said guide member, the legs of said U-shaped outfeed aperture extending in a direction transverse to that of said infeed aperture, presser means including a pair of oppositely rotatable rollers disposed on the outfeed aperture side of said guide member and forming a nip therebetween, and a wire rigidly affixed at one end thereof to said guide member adjacent said infeed aperture and extending through said outfeed aperture and in said nip, said presser means being adapted to draw said web through said apertures along said wire and permanently deform said web about said wire to form a longitudinally extending fold thereon.

References Cited in the file of this patent

UNITED STATES PATENTS

| | | |
|---|---|---|
| 1,958,957 | Hartman | May 8, 1934 |
| 2,845,010 | Keenan | July 29, 1958 |